Sept. 9, 1952 P. TERRAILLON 2,610,051
HOUSEHOLD STYLED SCALE OR WEIGHING MACHINE
WITH CURSOR INDEX WEIGHTS
Filed March 21, 1947 5 Sheets-Sheet 2
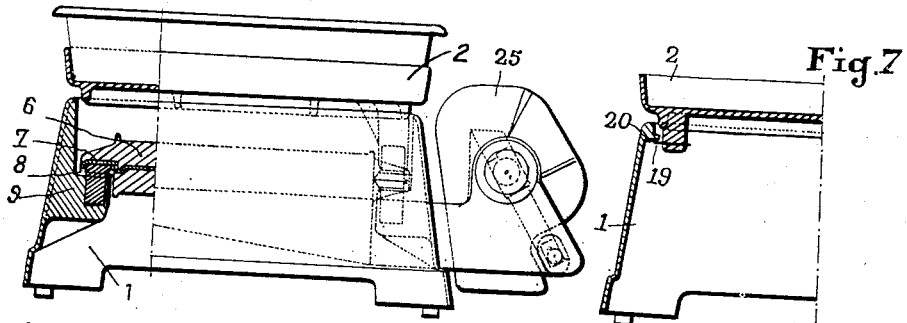
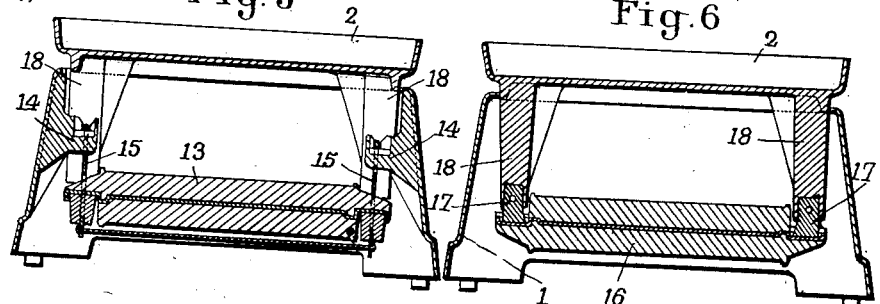
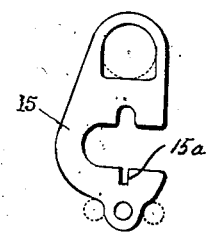
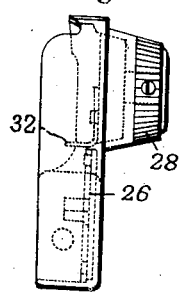

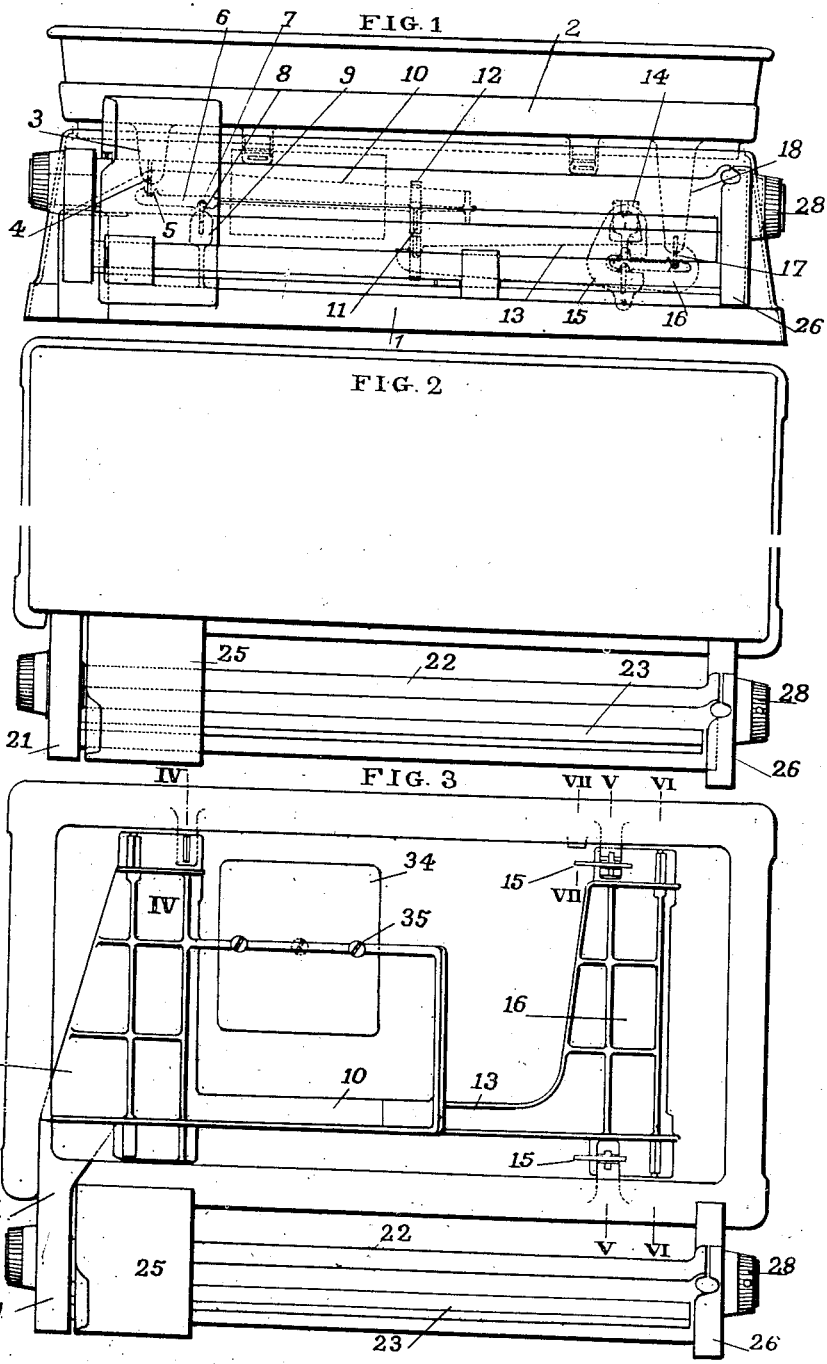

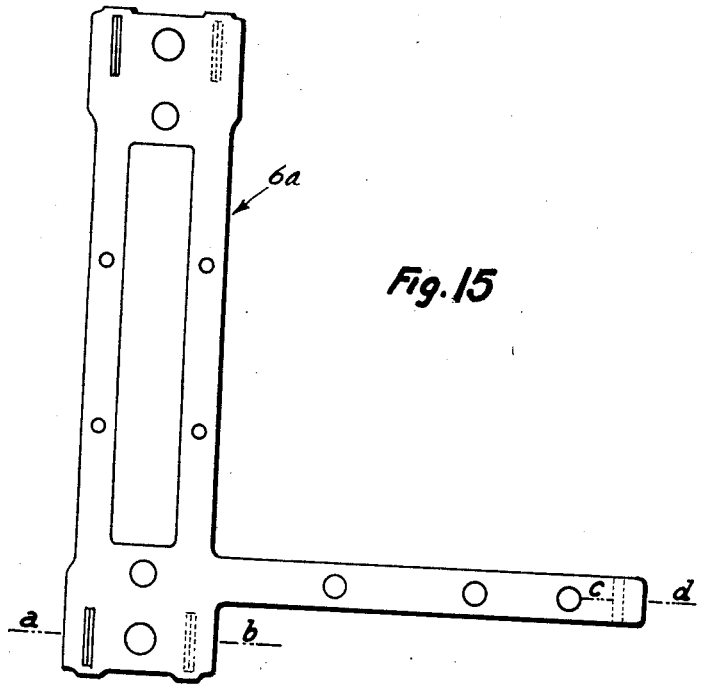
Fig. 15
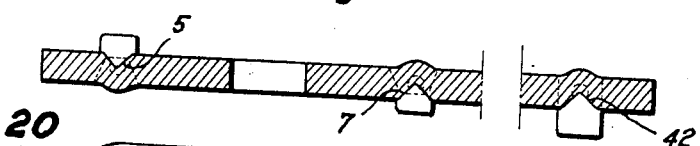
Fig. 16
Fig. 17
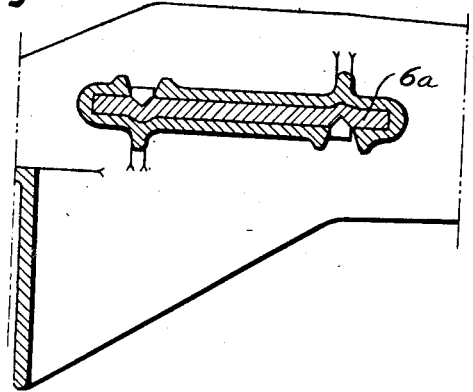
Fig. 20
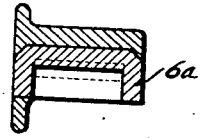
Fig. 21

Sept. 9, 1952 P. TERRAILLON 2,610,051
HOUSEHOLD STYLED SCALE OR WEIGHING MACHINE
WITH CURSOR INDEX WEIGHTS
Filed March 21, 1947 5 Sheets-Sheet 4
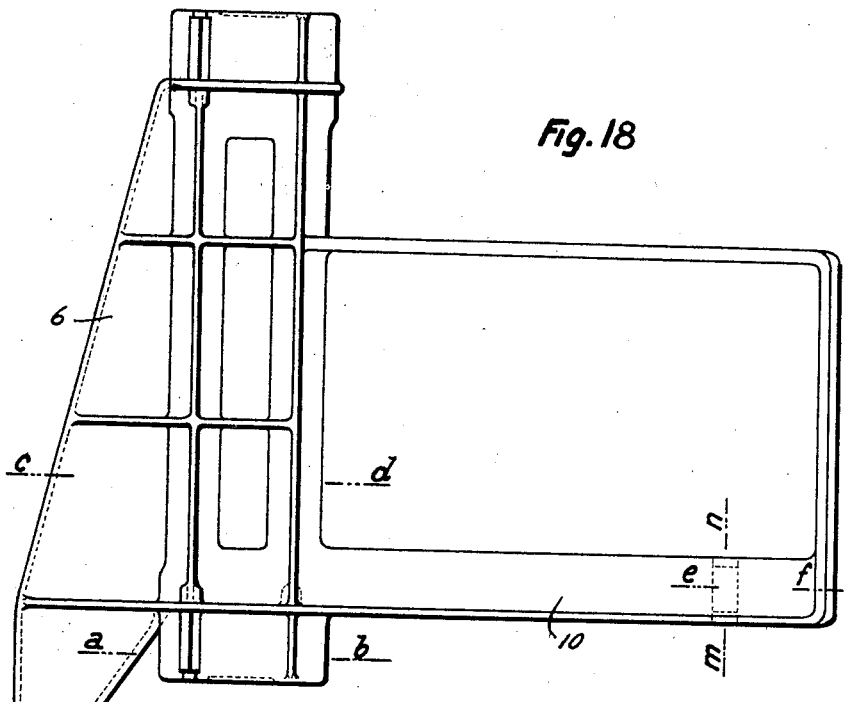
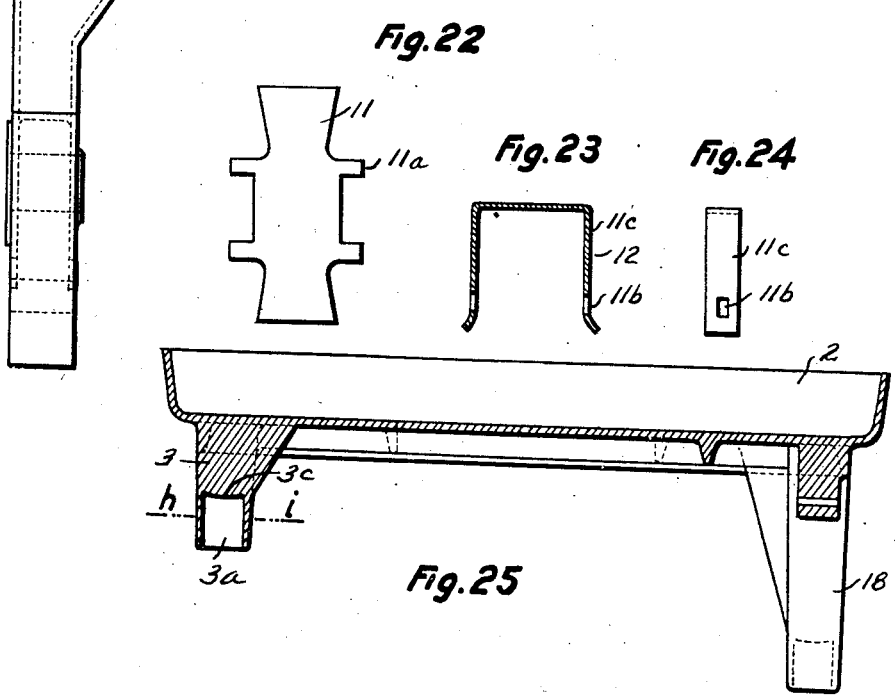

Sept. 9, 1952                 P. TERRAILLON              2,610,051
HOUSEHOLD STYLED SCALE OR WEIGHING MACHINE
WITH CURSOR INDEX WEIGHTS
Filed March 21, 1947                                         5 Sheets-Sheet 5
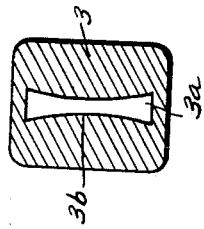
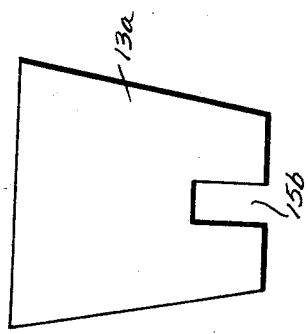
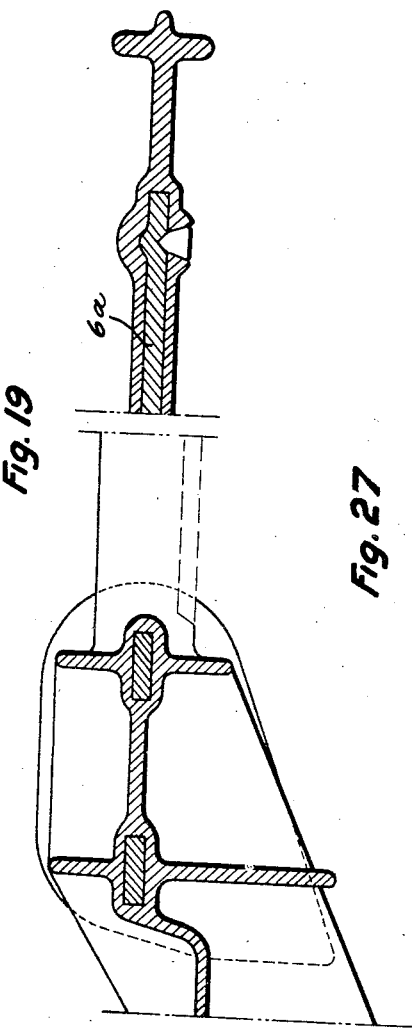
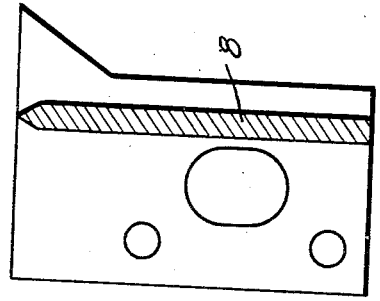
Inventor:
Paul Terraillon
by Michael S. Striker
agt Patented Sept. 9, 1952

2,610,051

UNITED STATES PATENT OFFICE 2,610,051

HOUSEHOLD STYLED SCALE OR WEIGHING MACHINE WITH CURSOR INDEX WEIGHTS

Paul Terraillon, Revigny, France

Application March 21, 1947, Serial No. 736,212
In France April 10, 1946

4 Claims. (Cl. 265—27)

My present invention relates to a weighing device, and more particularly, to a household scale of the type having a pair of cooperating balance levers.

An object of my invention is to provide an improved form of knife edge supports and bearings for the knife edges in this type of scale.

A more general object of my present invention is to reduce the cost of manufacture of such scales by simplification in the structure of the balance levers and knife edges.

It is a further object of my present invention to combine such reduction in manufacturing cost with an increased accuracy of the device. In this respect it is a particular advantage of my invention to provide for a high precision scale which can be manufactured at considerably lower cost than that of similar devices now on the market.

A further object of my invention is to provide for knife edges and bearings in the type of scale set forth which may be manufactured from types of material and by processes which could not be used for this purpose heretofore.

With the above objects in view my present invention relates to a weighing device of the type having at least one balance lever and at least one knife edge forming a support for said balance lever, and consists in combination of a bearing plate embedded in said lever, and aligned recesses formed in said bearing plate and lever for receiving said knife edge.

A weighing machine with a particularly advantageous form of knife edges and bearings, according to my invention, consists in a base, at least one balance lever, a bearing plate embedded in said balance lever, a pair of aligned recesses formed in said bearing plate and lever, a support rising from said base, a recess formed in said support, a metal plate secured in said recess and projecting therefrom, the said metal plate having a narrow cross-sectional diameter so as to constitute a knife edge with its projecting portion, and the said knife edge being received in said pair of recesses.

The general structure of scale in accordance with my invention consists in a base, a load receiving receptacle, at least two balance levers disposed reversely and in different horizontal planes, a knife edge support for each of said balance levers for maintaining the same on said base, each of the said knife edge supports being disposed relatively to the corresponding balance lever so as to form a short lever arm and a long lever arm, knife edge supports for supporting said receptacles on said balance levers, one knife support being provided for each lever and being disposed substantially at the outer end thereof, and a double knife edge support for maintaining the inner ends of said balance levers on each other.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a front view of the scale according to my invention;

Fig. 2 is a plan view of the same;

Fig. 3 is a similar plan view after removal of the pan;

Fig. 4 is an end view of the scale partly in section along line IV—IV of Fig. 3;

Fig. 5 is a section on line V—V of Fig. 3;

Fig. 6 is a similar section on line VI—VI of Fig. 3;

Fig. 7 is a fragmentary view on line VII—VII of Fig. 3;

Fig. 8 is a fragmentary view of the beam of the device, showing the same from the front;

Fig. 9 is a transversal fragmentary view in section on line IX—IX of Fig. 8;

Fig. 10 is a fragmentary view of the locking device employed for locking the scale in inoperative position, this view showing the locking device from the side thereof;

Fig. 11 is a view similar to Fig. 10 but in section;

Fig. 12 is a view of the locking device from the inner end thereof, the locking device being in unlocked position;

Fig. 13 is a view similar to Fig. 12 but showing the device locked;

Fig. 14 is a detailed view of the hanger employed for suspending the lower balance lever of the scale from the base;

Fig. 15 is a plan view of the bearing plate associated with each of the balance levers in my invention;

Fig. 16 is a side view of the bearing plate shown in Fig. 15;

Fig. 17 is a section along lines ab, cd of Fig. 15 on an enlarged scale;

Fig. 18 is a plan view of the upper balance lever showing the same integral with the bearing plate;

Fig. 19 is a section along lines cd and ef of Fig. 18 for illustration of the manner of encasement of the bearing plate in the lever;

Fig. 20 is a separate section on line ab of Fig. 18;

Fig. 21 is a section on line mn of Fig. 18;

Fig. 22 is an elevation of the double knife edge member employed for supporting the inner ends of the two balance levers on each other;

Fig. 23 is a section through the stirrup for supporting the double knife edge member shown in Fig. 22;

Fig. 24 is a side view of the stirrup;

Fig. 25 is a fragmentary transversal vertical section on lines p—p, 9—9 of Fig. 2 through the pan and the feet by which the pan is supported on the balance levers;

Fig. 26 is a horizontal section through one of the feet illustrating the recess for the corresponding knife edge;

Fig. 27 is a vertical cross section through one of the knife edges; and

Fig. 28 is a view of the knife edge employed with the hanger shown in Fig. 14 for maintaining one of the balance levers on the base of the device.

Referring to the drawings and in particular to Figures 1 to 6, it will be seen that the scale according to my invention is provided with a base 1 which may be made from a cast metal material or a suitable alloy. Supported on the base is the weighing pan 2. The pan is provided with short feet 3 at one end and relatively long feet 18 at the other end.

Interposed between the base and the pan are two balance levers. Each of these levers has a short arm of wide cross-section and a comparatively narrow long arm. The short arm of the upper lever is indicated as 6 and its long arm is referred to as 10. The arms of the lower lever are designated as 13 and 16.

Formed integrally with the feet 3 of the pan 2 in a manner to be described are knife edges 4 which rest in bearings 5 at the free end of the upper lever. The fulcrum of the upper lever is constituted by a similar knife edge 8 which engages at one end a support 9 extending from the base 1, and at the other end a notch 7.

The long feet 18 of the pan are similarly formed with knife edges 17 which engage notches in the short arm 16 of the lower balance lever. This lower lever is maintained on the base by a hanger 15 (Fig. 14) which is suspended from a bracket 14 of the base 1. A knife edge 13a engages notches 15a of the hanger. As appears from Fig. 28 the knife edge member itself is provided with an incision 15b for engaging the lateral wall of the hanger.

It will thus be seen that the two levers are arranged in different horizontal planes and in opposite direction and that they support the weighing pan at the free ends of their short arms and are each fulcrumed on a knife edge that in turn, is supported by the base. In addition, the two levers are supported on each other at their inner ends, i. e. at the free ends of their long arms by a double knife edge 11 which is supported on the levers by stirrups 12. As appears from Figs. 22, 23 and 24, the stirrups are provided with apertures 11b for engagement of projections 11a of the double edge knife member 11.

A double branched beam 22, 23 is rigidly secured by a bracket 21 to the arm 10 of the upper lever. Movable on this beam is a slide 25 which constitutes the counterweight of the device and cooperates with scales (not shown) provided on the two branches 22 and 23 of the beam. The free ends of the beams 22 and 23 rest on appropriate portions of an abutment of the base.

In order to lock the device a locking arrangement of the following form is provided: A casing 26 is secured by a fastening member 27 to the base. On the casing is a turnable knob 28 which is provided with an inner projection 29. This projection engages a slot 30 on a slide member 31. By turning the knob the slide member is raised and a projection 32 provided on the slide then projects into the path of the beam 22. Thereby the beam is locked and operation of the device is prevented.

The formation of the bearings for the knife edges and of the knife edges themselves will now be described:

With particular reference to Figs. 15 to 21, it will be noted that the lever 6, 10 is formed with a bearing plate 6a. Preferably, the bearing plate is made of steel and is placed in the mold for the lever and the two members are then molded together under pressure. A suitable molding material would be a zinc alloy such as is known under the name "Zamak." The molding is preferably performed by injection molding. After opening of the mold there is no further truing or adjusting of the individual bearings for the knife edges necessary since the bearings constitute one rigid block with the lever. As appears particularly from Fig. 17 the bearing plate 6a is provided with one notch 5 at its upper face and two notches 7 and 42 at its lower face. The upper notch 5 is designed to form the bearing for the knife edge 4. The lower notch 7 accommodates the knife edge 8 and the notch 42 accommodates the upper edge of the double edge knife member 11. There is thus formed a single unit in which all three bearings for the knife edges are provided.

The same form of bearing plate will of course be provided also for the other balance lever 13, 16.

The knife edges are constituted in the following way: Referring particularly to Figs. 25 to 28, it will be seen that there are formed in the feet 3 and 18 cavities 3a having convex side walls 3b and a convex bottom 3c. Set into these cavities are flat metal plates such as illustrated in Figs. 27, 28. It will be appreciated that by this form of cavity a slight adjustment of the knife edge plate in all directions is possible. It will also be understood that the metal plates forming the knife edge members are preferably constituted by simple steel plates which is possible because of the accurate formation of the cooperating bearings for the knife edges.

It will furthermore be understood that the knife edges 8 and 17 are constituted in the same manner as just described for the knife edge 4.

A counterweight 34 may be shifted on a track forming part of the upper lever 6, 10 and may be permanently locked in place by screws 35.

While I have illustrated and described the invention as embodied in weighing devices, I do not intend to be limited to the details shown, since various modifications and structural changes may be made without departing in any way from the spirit of my invention.

What I claim as new and desire to secure by Letters Patent is:

1. In a weighing device, in combination, a base; at least one balance lever; a bearing plate embedded in said balance lever; at least two pairs of aligned recesses formed in said bearing plate on opposite faces thereof; a support rising from said base; a recess formed in said support; a metal plate freely supported in said recess and projecting therefrom, the said metal plate having a narrow cross-sectional thickness so as to constitute a knife edge with its projecting portion for supporting said balance lever, the said knife edge being received in one of said pairs of recesses; a weighing pan; feet extending downward from said weighing pan; a recess formed in each of said feet; a metal plate freely located in each of said recesses and projecting therefrom, the said metal plate having a narrow cross-sectional thickness so as to constitute a knife edge with its projecting portion for supporting said weighing pan on said balance lever, the latter knife edge being received in the other of said pairs of recesses.

2. In a weighing device, in combination, a base; at least one balance lever; a support rising from said base; a recess formed in said support, the said recess having convex side walls and a convex bottom; a flat metal plate freely supported in said recess and projecting therefrom, the said metal plate having a narrow cross-sectional thickness so as to constitute a knife edge with its projecting portion for supporting said balance lever; and means for supporting a load on said balance lever.

3. In a weighing device, in combination, a base; at least one balance lever; means for supporting said balance lever on said base; a weighing pan; feet extending downward from said weighing pan; a recess formed in each of said feet, the said recess having convex side walls and a convex bottom; a flat metal plate freely located in each of said recesses and projecting therefrom, the said metal plate having a narrow cross-sectional thickness so as to constitute a knife edge with its projecting portion for supporting said weighing pan on said balance lever.

4. In a weighing device, in combination, a base; a load receiving receptacle; at least two balance levers disposed reversely and in different horizontal planes; a knife edge support for each of said balance levers for maintaining the same on said base, each of the said knife edge supports being disposed relatively to the corresponding balance lever so as to form a short lever arm and a long lever arm; knife edge supports for supporting said receptacle on said balance levers, one knife edge support being provided for each lever and being disposed substantially at the outer end thereof; a double knife edge element for maintaining the inner ends of said balance levers on each other; and stirrup-shaped suspension means for maintaining said double knife edge element on said two balance levers.

PAUL TERRAILLON.

REFERENCES CITED

The following references are of record in the file of this patent:

UNITED STATES PATENTS

| Number | Name | Date |
|---|---|---|
| 201,604 | Follett | Mar. 26, 1878 |
| 349,521 | Sanger | Sept. 21, 1886 |
| 1,290,564 | Jankower | Jan. 7, 1919 |
| 1,383,504 | Weber | July 5, 1921 |
| 1,415,508 | Bandoly | May 9, 1922 |
| 1,569,608 | Bergen | Jan. 12, 1926 |
| 1,764,649 | Schaper | June 17, 1930 |
| 1,780,262 | Jaenichen | Nov. 4, 1930 |
| 2,329,969 | Winter | Sept. 21, 1943 |

FOREIGN PATENTS

| Number | Country | Date |
|---|---|---|
| 677,890 | Germany | July 5, 1939 |
| 526,559 | Great Britain | Sept. 20, 1940 |